US005652381A

United States Patent [19]

Fuchs

[11] Patent Number: 5,652,381

[45] Date of Patent: Jul. 29, 1997

[54] IGNITION SYSTEM TEST INSTRUMENT

[76] Inventor: Richard W. Fuchs, 17 Deerfield La., Simsbury, Conn. 06070

[21] Appl. No.: 613,632

[22] Filed: Mar. 11, 1996

[51] Int. Cl.[6] .......... G01M 15/00

[52] U.S. Cl. .......... 73/118.1; 73/117.1; 324/383; 324/393; 324/402

[58] Field of Search .......... 73/115, 116, 117.1, 73/117.2, 118.1; 324/383, 393, 400, 401, 402

[56] References Cited

U.S. PATENT DOCUMENTS

| | | | |
|---|---|---|---|
| 1,700,026 | 1/1929 | Cole | 324/401 |
| 1,743,881 | 1/1930 | Cole | 324/401 |
| 4,570,124 | 2/1986 | Fuchs | 324/401 |

*Primary Examiner*—George M. Dombroske
*Assistant Examiner*—Eric S. McCall
*Attorney, Agent, or Firm*—McCormick, Paulding & Huber

[57] ABSTRACT

An ignition system test instrument used on spark ignited engines includes a housing having a spark chamber. A sleeve with an open and a closed end is slidably mounted over the housing. A compression chamber is formed between the sleeve closed end and the housing. An air passage connecting the spark and compression chambers extends through the housing. The sleeve can be moved relative to the housing, from a lower to an upper position to compress the air in the compression chamber and the spark chamber. A pair of electrodes is mounted to the housing and extend into the spark chamber to form a spark gap. The electrodes are connected in circuit to an engine ignition voltage source. With the spark gap under pressure, the engine can be turned over and the arc (if any) between the electrodes can be observed. A pressure gauge is carried by the housing for sensing and indicating the air pressure in the spark chamber. A housing groove with a frusto-conical surface, and a diametrically expandable ring received in its groove, provide a frictional holding means for holding, against the force of the pressurized air, the sleeve in whatever upper position it is moved to, yet the holding force provided can be easily overcome by applying manual force to the sleeve to change its position relative to the housing.

20 Claims, 1 Drawing Sheet

IGNITION SYSTEM TEST INSTRUMENT

FIELD OF THE INVENTION

The present invention relates to the field of engine diagnostics, and deals more particularly with an improved instrument for testing the ignition system of spark ignited internal combustion engines.

BACKGROUND OF THE INVENTION

The present invention has particular utility in connection with the testing of single and multi-cylinder spark ignited engine ignition systems and is described herein as applied to such use. In evaluating an engine ignition system, certain visible operating characteristics of the spark arc across the electrodes of the spark plug are indicative of ignition system performance. Particularly, abnormal color, low intensity, or non-uniform firing frequency of the spark arc are characteristic of unacceptable system function.

Therefore, in diagnosing and troubleshooting an ignition system, it is best to test the ignition system from the position of the spark plug by observing the visual attributes of the spark arc. Moreover, it is desirable to evaluate the system under simulated operating conditions wherein the ignition system is functioning under a selectively variable load (e.g., subjecting the spark gap to varying ambient pressures).

A known instrument for testing an ignition system in a single or multi-cylinder engine is shown, for example, by U.S. Pat. No. 4,570,124. The instrument of this patent uses a commercial spark plug as the spark arc generation means. The spark plug is carried by a housing and the spark gap in the plug is positioned in a transparent chamber that can be pressurized. A pressure gage is mounted to the housing at an end opposite the spark plug in communication with the chamber. A manually operated air pump with a reciprocating pumping sleeve between the pressure gage and the spark plug pressurizes the chamber to subject the spark gap to various pressures. The instrument is connectable in circuit with an ignition voltage source of an engine. After such connection, the pumping sleeve is then reciprocated to pressurize the chamber to a desired level. The engine is then "turned over" and the characteristics of the spark arc across the spark plug's electrodes are observed.

In the past, the use and accommodation of a spark plug within the housing, and the complex pumping mechanism required to pressurize the chamber made the instrument somewhat expensive to manufacture and therefore sometimes not economically attractive to non-professionals who perform their own engine maintenance. Additionally, because the pumping sleeve was positioned between the spark plug and the pressure gauge, the stroke of the pumping sleeve was short. Therefore, several reciprocations of the pumping sleeve were required to attain maximum system pressure. Check valves and multiple seal arrangements were also needed to maintain the system pressure at a desired level.

It is important that an ignition system test instrument of the type in question be simple and straightforward to use. Additionally, such an instrument should be capable of economical manufacture.

Accordingly, the general object of the present invention is to provide an ignition system test instrument for testing both single and multi-cylinder engines that is easy to use and can be manufactured at relatively low cost.

A further object of the present invention is to provide an ignition system test instrument wherein the system can be pressurized to a desired pressure level without having to manually cycle the pump a multiple number of times.

It is yet a further object of the present invention to provide an ignition system test instrument of the foregoing character wherein the desired system pressure can be established and maintained without the use of check valves or multiple seal arrangements.

SUMMARY OF THE INVENTION

The present invention resides in an ignition system test instrument comprising a spark chamber housing having an upper and lower end and an interior spark chamber located between the upper and lower ends. The spark chamber housing has a transparent portion for permitting visual observation of the interior spark chamber. The lower end of the spark chamber housing constitutes a piston portion having a cylindrical outer surface concentric with a vertical axis. A passageway extends vertically from the spark chamber to the lower end of the spark chamber housing. A sleeve cooperating with the housing has an open upper end and an interior sleeve surface extending downwardly from the upper end to a closed lower end. The piston portion of the housing is slidably received in the sleeve, and once it is so received the portion of the sleeve between the piston portion of the housing and the closed end of the sleeve forms a compression chamber. The sleeve is moveable from a lower to an upper position relative to the housing to compress the air in the compression and spark chambers. A holding means releasably holds the sleeve at whatever position it is moved to relative to the housing. Two electrodes are carried by the housing and are located at least in part in the spark chamber to form a spark gap, between the electrodes, visible through the transparent portion of the spark chamber housing. Suitable parts are provided for connecting the electrodes in circuit with the ignition system to be tested; and a dial pressure gauge or other pressure sensing and indicating means is carried by the housing for sensing and indicating the pressure of the air in the spark chamber.

The invention also resides in the structure of the holding means whereby the spark chamber housing has an annular groove positioned between the spark chamber and the lower portion of the housing. The annular groove has first and second surfaces in planes at right angles to the axis of the housing, and spaced from one another along the axis of the housing, which surfaces extend inwardly from the piston portion's outer surface, and a third frusto-conical surface intersecting the first and second surfaces. The first surface extends inwardly from the piston's outer surface to a greater extent than the second surface and is located closer to the spark chamber than the second surface, the third surface diverging radially outwardly in the direction away from the spark chamber from the first surface to the second surface. A ring is mounted within the groove such that it can slide along the frusto-conical surface. The ring engages both the interior sleeve surface and the frusto-conical housing surface. Movement of the sleeve relative to the spark chamber housing in the direction away from the spark chamber causes the ring to slide along the frusto-conical surface until the ring becomes wedged between the sleeve and the housing to a degree sufficient to maintain the position of the sleeve against the force of the compressed air.

The present invention further resides in that the sleeve is removable from the housing to expose the spark chamber to atmospheric pressure, so that when the sleeve is reassembled with the housing, the air compression caused by the upward movements of the sleeve begins from atmospheric pressure.

The present invention still further resides in the dimensions of the spark and compression chamber being such that when the sleeve is moved from a lower to an attainable upper position in a single stroke, the spark chamber is pressurized to the maximum level desired for test purposes by movement of the sleeve. Additionally, by movement of the sleeve, the pressure in the spark chamber can be set to any value between atmospheric and said maximum level. When the desired pressure is achieved, the sleeve is then held at its corresponding position by the holding means so that the pressure level in the spark chamber is maintained, but when later desired the sleeve can easily be moved from such position by manually applying force to the sleeve sufficient to overcome the grip of the holding means.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

Figure 1:
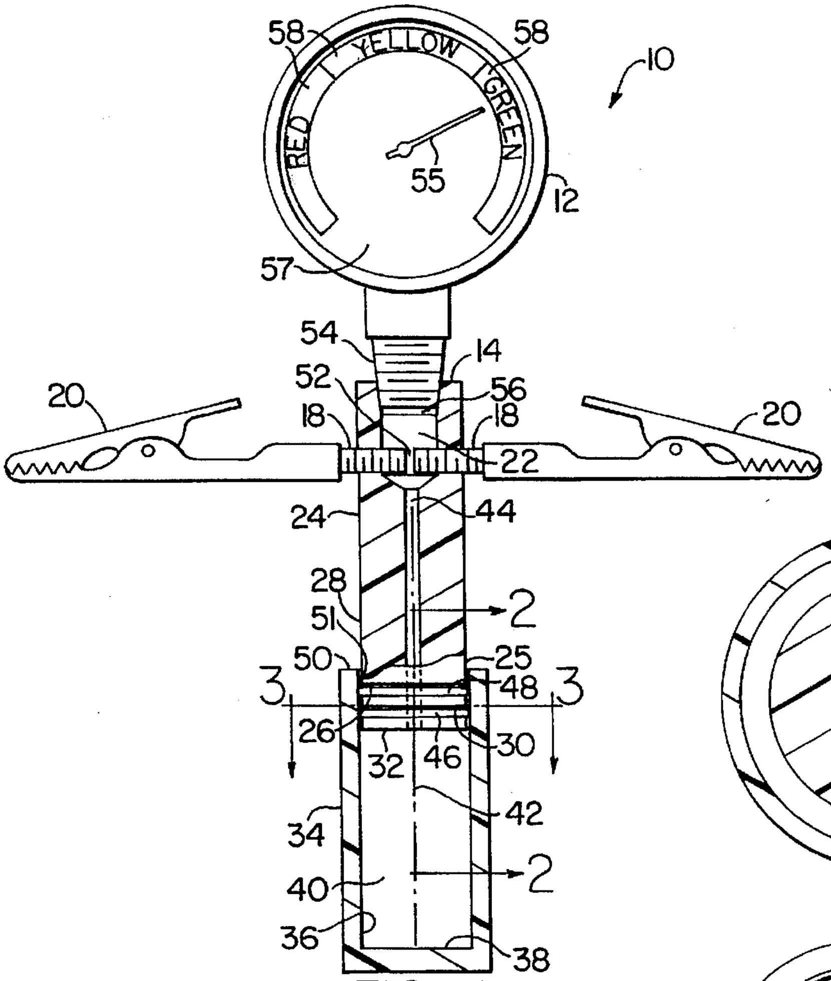
FIG. 1 is a partly in front elevation and partly in vertical section view of an ignition system test instrument embodying the invention.

Turning to the drawings and first referring to FIG. 1, the preferred embodiment of an ignition system test instrument, there shown and generally designated as 10, comprises a transparent cylindrical spark chamber housing 24, made of a suitable plastic such as Lexan, having an upper end 14 and a lower end 32, an interior spark chamber 22 positioned between the upper end 14 and the lower end 32, a pair of electrodes 18 forming a spark gap 52 in its chamber 22, a bore 56 extending from the upper end 14 and into the spark chamber 22, a piston portion 25 with a cylindrical outer surface 28 near the lower end concentric with the vertical central axis 42 of the housing, and an air passageway 44 extending vertically from the spark chamber 22 to the lower housing end 32.

Figure 4:
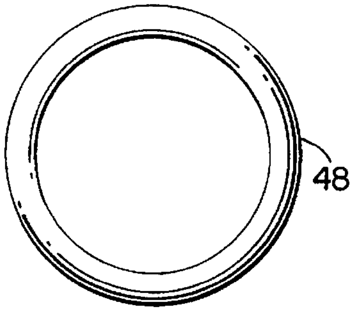
FIG. 4 is a view of the elastomeric seal.
Figure 2:
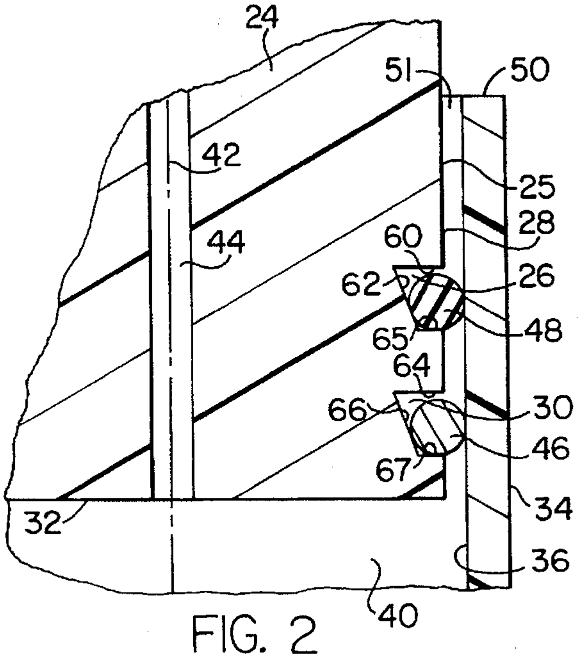
FIG. 2 is a fragmentary vertical sectional view of the holding and sealing means in enlarged scale taken on the line 2—2 of FIG. 1.
Figure 5:
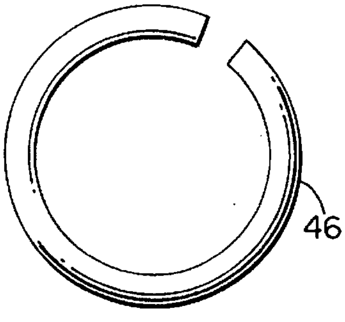
FIG. 5 is a view of the split metal ring.

Referring to FIG. 2, the spark chamber housing 24 includes first and second annular grooves, 30 and 26. The first groove 30 is positioned between the spark chamber 22 and the piston portion 32 and is defined by first and second surfaces 64 and 67 in planes at right angles to the housing vertical axis 42 extending inwardly from the outer housing surface 28 and spaced from one another along the axis 42. The first surface 64 extends inwardly farther than the second surface 67 and is located closer to the spark chamber 22 than the second surface. A third frusto-conical surface 66 extends between the inner ends of the first and second surfaces 64 and 67 so as to diverge radially outwardly in the direction away from the spark chamber 22. A resilient and diametrically expandable split metal ring 46, shown in FIG. 5, is received in the first groove 30 and has a thickness, as seen in FIG. 2, which is somewhat less than the spacing between the first and second groove surfaces 64 and 67. The second annular groove 26 is positioned between the first groove 30 and the spark chamber 22 and, similar to the first groove, is defined by first and second surfaces 60 and 65 in planes at right angles to the housing vertical axis 42 extending inwardly from the outer housing surface 28 and a third frusto-conical surface 62 intersecting the first and second surfaces 60 and 65 and diverging radially outwardly in the direction away from the spark chamber 22. A continuous elastomeric and diametrically expandable seal or O-ring 48, shown in FIG. 4, is received within the second annular groove 26 and has a thickness, as seen in FIG. 2, somewhat less than the spacing between the first and second groove surfaces 60 and 65.

Figure 3:
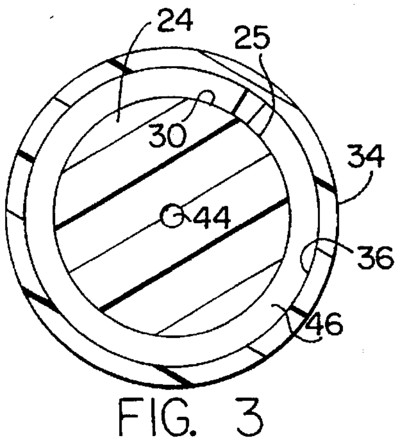
FIG. 3 is a horizontal sectional view of the sleeve radially disposed about the housing taken on the line 3—3 of FIG. 1.

Referring back to FIG. 1, the illustrated instrument 10 further includes a transparent cylindrical sleeve 34, made of Lexan or other suitable plastic, having an open upper end 50, a bore 51 defining a cylindrical interior sleeve surface 36 extending downwardly from the upper end 50, and a closed end 38. Referring to FIGS. 1 and 3, the piston portion 25 of the housing is slidably receivable in the bore 51 and when so received, the portion of the bore 51 between the lower end 32 of the housing 24 and the sleeve closed end 38 forms an air compression chamber 40. The sleeve and housing are in air sealing engagement with the annular seal 48. Therefore, when the sleeve 34 is moved from a lower position to an upper position the seal prevents air from escaping between the sleeve and the housing, and instead the air is trapped and compressed in the spark and compression chambers 22 and 40 and in the bore 44. When the trapped air is so pressurized, it tends to urge the sleeve toward its lower position relative to the housing due to the pressure acting on the lower closed end of the sleeve 38. However, when such retrograde movement of the sleeve starts to occur, both the split metal ring 46 and the seal ring 48, due to the downwardly directed frictional force imposed on them by the sleeve, move downwardly over their associated frusto-conical groove surfaces and become wedged between the housing and the sleeve, with such wedging action being limited by the rings 46 and 48 coming into contact with the second surfaces 67 and 65 of their annular grooves. This in turn increases the friction force resisting the retrograde movement. The grooves 30 and 26 and the rings 46 and 48 are so dimensioned that the friction forces hold the sleeve against downward movement, yet these frictional holding forces can be overcome, to return the sleeve to its lowered position or to fully separate it from the housing, by manually pulling the sleeve downwardly. The amount of manual force required to achieve such downward movement can usually be reduced by also manually rotating the sleeve somewhat relative to the housing as it is pulled downwardly. Also, by manually pushing upwardly on the sleeve it can be shifted to a more upwardly advanced position if not already at the upper limit of its stroke.

A suitable means for sensing and indicating the pressure existing in the spark chamber is provided on part of the instrument 10. This means may take various forms, and in the illustrated and preferred case is a dial pressure gage 12, having, an externally threaded connecting portion 54 threaded into the spark chamber housing 24, for sensing and indicating the pressure of the air in the spark chamber 22. The pressure gage 12 has a needle 55 movable angularly relative to a face 57, and a number of color coded bands 58 indicating a number of different pressure ranges. The operating characteristics of the ignition system can be evaluated by observing the nature of the spark, if any, occurring between the electrodes 18 when the spark chamber pressure is within one or the other of the pressure ranges.

The illustrated electrodes 18 are each electrically conductive and threaded into the spark chamber housing 24 and they extend into the spark chamber 22 such that the spark gap 52 is formed with a predetermined spacing or gap between the opposed ends of the electrodes. It should be understood however that, in its broader aspects, the present invention is not limited in this regard and that other forms of electrodes may be substituted for the ones illustrated. Two alligator clips 20 are rigidly attached respectively to the two electrodes such that electrical continuity is maintained between the alligator clips 20 and the electrodes 18, to allow the test instrument to be readily connected in circuit with the ignition system to be tested. While alligator clips are shown, many other types of connection means known to those skilled in the art may be substituted without departing from the broader aspects of the invention.

In using the test instrument 10, the alligator clips 20 are connected in circuit to a source of ignition voltage on the engine being tested, as by connecting one clip to an electrically grounded part of the engine and connecting the other clip to a high voltage wire otherwise normally connected to a spark plug.

The use of the alligator clips rigidly connected to the electrodes allows the test instrument to be held in place non-manually during a test procedure, thereby inhibiting the user from holding the instrument and accordingly inhibiting the user from receiving an electrical shock.

The sleeve 34 is then manually moved from its lower position to such an upper position as to pressurize the spark chamber 22 to the desired pressure which the operator determines by observing the pressure gauge and stopping the upward movement when the desired pressure is reached. The ignition system is energized by turning over the engine with its starting means—rope or starting motor—and the spark arc, if any, occurring between the electrodes is observed. If an acceptable arc is achieved at an acceptable pressure, no further testing may be needed. If the arc is unacceptable, the spark chamber pressure can be either increased or decreased by moving the sleeve 34 relative to the spark chamber housing 24 and the test repeated. This process can continue until sufficient information is obtained to diagnose the ignition system's problem.

It should also be noted that the housing 24 and sleeve 34 are so dimensioned that when the sleeve is in such a position that the trapped air is compressed to a degree appropriate for testing purposes, a volume of air remains in the compression chamber 40 and in the bore 44 which is sufficient, in comparison to the volume of air in the spark chamber 22, to prevent significant changes in the pressure of the air in the spark chamber throughout a given test period, despite slight leakage of compressed air from the instrument or changes in the temperature of the compressed air.

It is to be understood that the form of the invention shown and described herein is to be taken as a preferred embodiment of the same, and that various changes in the selection of parts comprising the broadly defined means and in the arrangement of said parts may be resorted to without departing from the spirit of the invention or the scope of the following claims.

I claim:

1. An ignition system test instrument comprising:

a spark chamber housing having an upper end, a lower end, an interior spark chamber located between said upper and lower ends, a transparent portion permitting visual observation of the interior spark chamber, a piston portion near said lower end having a cylindrical outer surface concentric with a vertical axis, and a passageway extending vertically from said spark chamber to said lower end;

a sleeve having an open upper end, a bore defining an interior sleeve surface extending downwardly from said upper end, and a closed lower end;

said piston portion of said spark chamber housing being slidably receivable in said sleeve and when so received the portion of said bore between said piston portion of said spark chamber housing and said closed end of said sleeve forming an air compression chamber;

a seal means between said interior surface of said sleeve and said outer surface of said lower housing portion for sealing said compression chamber;

said sleeve being movable from a lower position to an upper position relative to said spark chamber housing to compress the air in said compression and spark chambers;

a means for releasably holding said sleeve in said upper position relative to said spark chamber housing;

a pair of electrodes carried by said spark chamber housing and located in said spark chamber to form a spark gap between said electrodes, said spark gap being visible through said transparent housing portion;

means for connecting said pair of electrodes in circuit with the ignition system to be tested; and a pressure sensing and indicating means carried by said spark chamber housing for sensing and indicating the pressure of the air in said spark chamber.

2. The ignition system test instrument of claim 1 wherein the actual position assumed by said sleeve relative to said spark chamber housing when said sleeve is in said upper position is variable in order to vary the amount by which the air in said compression and spark chambers is compressed.

3. The ignition system test instrument of claim 1 wherein said releasable holding means holds said sleeve at whatever position it is moved to.

4. The ignition system test instrument of claim 1 wherein said sleeve is removable from said spark chamber housing to expose said spark chamber to atmospheric pressure, so that when said sleeve is reassembled with said spark chamber housing the compression caused by upward movements of said sleeve relative to said spark chamber housing starts from atmospheric pressure.

5. The ignition system test instrument of claim 1 wherein said spark chamber housing is a generally cylindrical member and said spark chamber is formed by a bore extending into said spark chamber housing from its upper end and a pressure gauge is threaded into the upper end of that bore to close and seal the upper end of the spark chamber.

6. The ignition system test instrument of claim 1 wherein said electrodes are electrically conductive threaded rods threaded into said spark chamber housing.

7. The ignition system test instrument of claim 6 wherein said means for connecting said pair of electrodes in circuit is a pair of alligator clips, each of said clips being electrically and rigidly connected to a respective one of said electrodes, to provide for a fixed rigid non-manual holding of the test instrument during a test procedure thereby inhibiting the user from manually holding said test instrument and thereby inhibiting personal harm through receiving an electrical shock.

8. The ignition system test instrument of claim 1 wherein said sleeve and said spark chamber housing are both made of a transparent plastic material.

9. The ignition system test instrument of claim 1 wherein both said spark chamber housing and said sleeve are generally cylindrical members.

10. The ignition system test instrument of claim 9 wherein said spark chamber housing further includes a first annular groove for retaining said holding means, said first annular groove being positioned between said spark chamber and said lower end of said spark chamber housing, having a first surface in a plane at right angles to said vertical axis, and extending inwardly from said housing outer surface, and a frusto-conical surface intersecting said first surface and diverging radially outwardly in a direction away from said spark chamber.

11. The ignition system test instrument of claim 10 wherein said holding means comprises a ring received in said first annular groove and engaging said interior surface of said sleeve such that when the air in said spark chamber is pressurized, it tends to urge said sleeve toward said lower position relative to said housing due to the pressure acting on said closed end of said sleeve, as a result of such retrograde movement, said ring, due to the downwardly directed frictional force imposed on it by said sleeve, moves downwardly over said frusto-conical surface and becomes wedged between said housing and said sleeve thereby arresting said retrograde movement of said sleeve.

12. The ignition system test instrument of claim 11 wherein said ring is a split metal ring.

13. The ignition system of claim 11, wherein said first annular groove includes a second surface in a plane at right angles to said vertical axis, said first surface being located closer to said spark chamber than said second surface and extending farther inwardly from said housing surface than said second surface, and said frusto-conical surface extending between the inner ends of said first and second surfaces.

14. The ignition system test instrument of claim 11 wherein said spark chamber housing further includes a second annular groove for retaining said sealing means said second annular groove being positioned between said spark chamber and said first annular groove, said second annular groove having a first surface in a plane at right angles to said vertical axis and extending inwardly from said piston portion outer surface and a frusto-conical surface intersecting said first surface and diverging radially outwardly in a direction away from said spark chamber.

15. The ignition system test instrument of claim 14 wherein said sealing means comprises an annular seal received within said second annular groove and engaging said interior portion of said sleeve such that when the air in said spark chamber is pressurized, it tends to urge said sleeve in retrograde movement toward said lower position relative to said housing due to the pressure acting on said closed end of said sleeve, and as a result of which retrograde movement said annular seal, due to the downwardly directed frictional force imposed on it by said sleeve tends to move downwardly over said frusto-conical surface and to become wedged between said housing and said sleeve so as to arrest said retrograde movement.

16. The ignition system of claim 15 wherein said second annular groove includes a second surface in a plane at right angles to said vertical axis, said first surface being located closer to said spark chamber than said second surface and extending farther inwardly from said housing surface than said second surface, and said frusto-conical surface extending between the inner ends of said first and second surfaces.

17. An ignition system test instrument comprising:

a transparent plastic cylindrical spark chamber housing having an upper end, a lower end, an interior spark chamber located between said upper and lower ends, a piston portion near said lower end having a cylindrical outer surface concentric with a vertical axis, and a passageway extending vertically from said spark chamber to said lower end;

a transparent plastic cylindrical sleeve having an open upper end, a bore defining a cylindrical interior sleeve surface extending downwardly from said upper end, and a closed lower end;

said piston portion of said spark chamber housing being slidably receivable in said sleeve and when so received the portion of said bore between said piston portion of said spark chamber housing and said closed end of said sleeve forming an air compression chamber;

said sleeve being moveable from a lower position to an upper position relative to said spark chamber housing to compress the air in said compression and spark chambers, the actual position assumed by said sleeve relative to said spark chamber housing when said sleeve is in said upper position being variable in order to vary the amount by which the air in said compression and spark chambers is compressed;

said spark chamber housing having a first annular groove, said first annular groove having a first surface in a plane at right angle to said vertical axis, and extending inwardly from said housing outer surface, and a second frusto-conical surface intersecting said first surface and diverging radially outwardly in a direction away from said spark chamber;

said spark chamber housing having a second annular groove positioned between said spark chamber and said first annular groove, said second annular groove having a first surface in a plane at right angle to said vertical axis and extending inwardly from said piston portion outer surface and a frusto-conical surface intersecting said first surface and diverging radially outwardly in a direction away from said spark chamber;

a split metal ring retained in said first annular groove;

a continuous annular sealing ring retained in said second annular groove;

said split metal ring and said continuous annular sealing ring act in combination so that when said sleeve is moved downwardly relative to said housing, said first annular groove frusto-conical surface and said second annular groove frusto-conical surface tend to wedge said split metal ring and said continuous annular seal between said housing and said sleeve sufficiently to arrest any downward movement of said sleeve caused by the force exerted on said sleeve closed end by the compressed air in said compression chamber;

a pair of electrodes in the form of conductive threaded rods, threadedly engaged with said spark chamber housing and extending into said spark chamber to form a spark gap between said electrodes, said spark gap being visible through said transparent plastic spark chamber housing;

a pair of alligator clips, one clip being connected respectively to each of said electrodes such that electrical continuity is maintained between said alligator clips and said electrodes for connecting said electrodes in circuit with the ignition system to be tested; and a pressure sensing and indicating means carried by said spark chamber housing for sensing and indicating the pressure of the air in said spark chamber.

18. The ignition system test instrument of claim 17 wherein the pressure indicating means is a pressure gage having an angularly moveable needle, and a face, said face having a plurality of color coded bands for indicating pressure ranges.

19. The ignition system test instrument of claim 17 wherein said frusto-conical surfaces of said grooves cause lower forces to be exerted by said rings on said inside diameter of said sleeve when said sleeve is moved toward said spark chamber to allow easier manual pressure generation and cause said rings to hold the sleeve in a given pressure generated position when manual force is removed from said sleeve.

20. The ignition system test instrument of claim 17 wherein the internal volumes are of such size as to accommodate minute pressure leakage, or compressed air temperature changes, so that the generated air pressure will not appreciably change over a given ignition test period.

* * * * *